Patented May 16, 1939

2,158,487

UNITED STATES PATENT OFFICE 2,158,487

TRIETHANOLAMINE ALGINATE PRODUCT AND PROCESS

Bennett Preble, National City, Calif., assignor to Kelco Company, Los Angeles, Calif., a corporation of Delaware No Drawing. Application October 22, 1935, Serial No. 46,214. Renewed July 21, 1938

15 Claims. (Cl. 260—116)

This invention relates to new alginate products and processes of producing same such as shown in my co-pending application Ser. No. 46,213, filed October 22, 1935. Its principal object is to produce triethanolamine alginates having novel and valuable properties, and useful for many purposes in the arts as hereinafter stated.

I have discovered that triethanolamine, diethanolamine and monoethanolamine, may be used in producing water soluble products from alginic acid. Commercial monoethanolamine is principally $NH_2C_2H_4OH$ (2 - amino-ethanol); commercial diethanolamine is mainly $$NH(C_2H_4OH)_2$$

and commercial triethanolamine is mainly $N(C_2H_4OH)_3$. The commercial grade of each of these contains a small amount of the other two. I have found the best results are obtained by using triethanolamine.

Furthermore, since triethanolamine is a hydroxy amine, other hydroxy amines, such as tripropanolamines, dipropanolamines and monopropanolamines may replace any of the ethanolamines. Complicated hydroxy amines for example the butanolamines, may be used.

In addition amines other than hydroxy amines, for example, simple aliphatic tertiary, secondary, or primary amines, such as tripentyl amines, dipentylamines, and monopentylamines, also substituted amines including chlorinated amines, may replace triethanolamines. These replacements of triethanolamines may be complete or partial or may be made by more than one amine.

The triethanolamine used in the manufacture of my product is a commercial grade made by the Carbide and Carbon Chemical Corporation, and consists of about 87% triethanolamine, 11% diethanolamine and 2% monoethanolamine. Any alginic acid may be used, but I prefer that manufactured by the methods disclosed in Thornley and Walsh Patent No. 1,814,981, or the Clark and Green application Serial No. 693,891, filed October 16, 1933; or the Green application, Serial No. 721,829, filed April 21, 1934; since the alginic acid made by any of the aforesaid methods is relatively pure.

I have found that when technical triethanolamine and alginic acid are mixed in the approximate proportions of their respective equivalent weights a neutral product is obtained and hence the reaction which occurs when alginic acid and triethanolamine are mixed may be expressed, as far as I have been able to ascertain, by the following theoretical equation:

$$N(C_2H_4OH)_3 \quad + \quad \tfrac{1}{n}(C_5H_7O_4COOH)n \;=\; \tfrac{1}{n}\Big[(C_5H_7O_4)COONH(C_2H_4OH)_3\Big]_n$$

Triethanolamine
Molecular and equivalent weight=149

Alginic acid
Equivalent weight=176

Triethanolamine alginate
Equivalent weight=325

In one method of preparing my novel alginate composition or product approximately 1000 lbs. of wet alginic acid manufactured by the method disclosed in the above mentioned Clark and Green application, is placed in a dough or other suitable paste mixer. This acid would contain about 10% (or 100 lbs.) of dry material if all the water were evaporated. The mixer is started and approximately 80 lbs. of commercial triethanolamine is added slowly. The triethanolamine reacts almost immediately on the fibrous mass in the mixer to produce a stiff or heavy paste. After about 30 minutes of mixing the reaction is complete and a dilute solution of the paste will have a pH value of approximately 7. This composition is relatively pure triethanolamine alginate.

Triethanolamine alginate paste in comparison with pastes made of gums, gelatin, casein, etc., will not spoil easily since it is resistant to the action of molds and micro-organisms which produce liquefaction and decay, and therefore molds grow or develop thereon very slowly; and such paste, if stored at temperatures below 40 degrees Fahrenheit or if some preservative such as formaldehyde is added thereto, may be preserved indefinitely.

To obtain a triethanolamine alginate composition of desired consistency, I may use an acid whose ammonia salt when in a 2% aqueous solution has a viscosity ranging from one to several thousand seconds, as measured by the Woolwich viscosity test. This test measures the time required in seconds for a $\tfrac{1}{16}$ inch diameter steel ball to fall 15 centimeters at 20° centigrade. Specific examples of how the viscosity of our triethanolamine alginate may be controlled are given in the following table showing how different acids give triethanolamine alginates of different viscosities:

| Alginic acid whose 2% ammonium salt gives a viscosity of— | Resulting triethanolamine alginate whose 2% solution gives a viscosity of about— |
|---|---|
| 25 | 4 |
| 82 | 12 |
| 90 | 13 |
| 95 | 14 |
| 1,000 | 100 |
| 10,000 | 800 |

A triethanolamine alginate having 4 seconds viscosity on a 2% solution will dry to produce a good film, whereas a triethanolamine alginate with 800 seconds viscosity would have to be diluted to such an extent that the resulting film would not give the desired results. Triethanolamine alginate having a higher viscosity is more desirable for some purposes, such as for producing a stronger film. Moreover, a high viscosity triethanolamine alginate has less tendency to run off the surface to which it is applied before becoming dry.

In one method in which ammonia may replace part of the triethanolamine to control the consistency and the nature of a dried film, approximately 1000 lbs. of wet alginic acid manufactured by the Clark and Green method is placed in a dough mixer, as above described, and 70 lbs. of commercial triethanolamine is slowly added along with 10 lbs. of 26° Baumé aqua ammonia. After about 30 minutes of mixing (different types of mixers may require more or less time) the resulting product has a pH between 7 and 8 and is an ammonium-triethanolamine alginate. This gives a film of medium pliability which dries faster.

A composition having a softer and more flexible film, may be produced by adding more than the combining chemical equivalent weight of triethanolamine so that the pH of a water solution of the paste is higher than 7. I have found 8.0 pH particularly useful. Sometimes when a smaller amount of triethanolamine is used so that the pH of the resulting paste is 6.0 or below, the product has a higher viscosity than if the pH were higher, and therefore has certain advantages for particular uses.

The pH of these triethanolamine alginate products will range between pH 3 and pH 11.

When a film of triethanolamine alginate is dried it is smooth, soft and flexible and feels plump to the fingers, is strong, and will not crack when bent sharply, and is readily soluble in water but insoluble in oils and greases.

The above enumerated properties are in sharp contrast to those of other alginate salts, such as sodium or ammonium alginates, which form relatively brittle hard films which will crack when bent sharply and which therefore cannot be successfully utilized.

Because of its strongly adhesive properties the triethanolamine alginate may be used for coating practically all solid surfaces such as cheese, meats, other food products, glass, metals, wood, plastics, ceramic ware and plaster.

For greater ease in shipping and handling, the triethanolamine alginate may be produced in a dry form by putting the pastes hereinbefore described in a mechanical drier of any conventional type, such as a drum drier. After drying, the product is reduced by means of a chopper or mill to a particle size that can be conveniently dissolved in water. In some cases the paste might be converted into a dilute solution and then dried by means of a spray drier.

The following is one method for producing the novel product in dry form:

Approximately 1000 lbs. of wet alginic acid is placed in a tank and diluted with water to about 1000 gallons. This mixture is then agitated while 80 lbs. of triethanolamine is added. The result is about a 2% solution of triethanolamine alginate. This mixture is then spray dried to give a fine powder containing approximately 80% triethanolamine alginate and 20% water.

Triethanolamine alginate may be produced by first drying or partially drying the alginic acid and then adding triethanolamine to it; as for example:

Approximately 1000 lbs. of wet alginic acid containing about 10% (or 100 lbs.) of dry material (if all the water was evaporated) is placed on trays and set in the sun or in a mechanical dryer until dried down to about 125 lbs. This material is ground to pass through a 30 mesh screen, and then placed in a mixer, and 90 lbs. of triethanolamine added, resulting in very stiff crumbly material having a pH of about 9.5 when made into a 2% solution.

This method takes longer to complete, but produces a good composition. This method reduces the viscosity of the product as drying the alginic acid reduces the viscosity of the resulting salts made from the acid, which reduction in viscosity is probably due to the depolymerization of the alginic acid.

In some cases the alginic acid may be dried to a very low moisture content with only a very slight reduction in the viscosity of the resulting salts made from the acid. This can be done, for example, by passing a current of dry, cold air over the alginic acid until the desired amount of moisture was removed. In this way the moisture content of the alginic acid can be reduced to a very low figure with only a slight reduction in the viscosity of the resulting salts made from the acid.

I have also found that by mixing dextrin with triethanolamine alginate paste prior to drying, the drying time can be shortened, and the product is more brittle and grinds easier, and will go into solution faster.

I have found that the addition of sucrose increases the adhesive properties under certain conditions and also increases the ease of solution. Besides sucrose and dextrin, other substances which do not react with or precipitate alginates may be incorporated with triethanolamine alginate. Among these are starch, glucose, fructose, maltose, xylose, glycerine or similar hydroxy compounds, or mixtures of these with each other; also gelatine and glue when so treated that they will not react with triethanolamine alginate, may be used.

If desired a preservative may be incorporated in the composition, for example—

Approximately 1000 lbs. of wet alginic acid is placed in a dough mixer and 60 lbs. of triethanolamine is added to form a wet paste containing partially neutralized alginic acid. The pH of such a paste is approximately 6. To this paste 1–1½ lbs. of formaldehyde is added as a preservative. Besides formaldehyde, other preservatives including sodium benzoate, may be added.

I have found that it is possible to replace a part of the triethanolamine by other basic substance and produce a composite composition containing some sodium, ammonium, potassium or other metal which could form a water soluble alginate salt.

My triethanolamine alginate product has certain properties which have special merit and is superior to competitive material, these properties being: (1) that a film is flexible and elastic; and (2) that a film is water-soluble and swells immediately when brought into contact with water and goes into complete solution or dispersion in the water.

I claim:

1. A triethanolamine salt of alginic acid.
2. A composition comprising essentially alginic acid and triethanolamine.
3. A composition comprising essentially alginic acid and triethanolamine mixed to form a paste.
4. A composition comprising essentially alginic acid and triethanolamine mixed to form a paste, the equivalent weights of the triethanolamine being about 149 and that of the alginic acid being about 176.
5. A composition comprising essentially alginic acid and triethanolamine mixed to form a neutral paste.
6. The process of preparing triethanolamine alginate consisting in adding triethanolamine to wet alginic acid until combined therewith to form a paste.
7. The process of preparing triethanolamine alginate which consists in adding triethanolamine to moist alginic acid until combined therewith to form a paste, drying the paste, and reducing the dried mass to desired particle size.
8. The process of preparing triethanolamine alginate, which consists in adding triethanolamine to wet alginic acid until combined therewith to form a paste, diluting the triethanolamine alginate with water, and spray drying the dilution.
9. The process of preparing triethanolamine alginate which consists in adding to approximately 1000 lbs. of moist alginic acid containing 10% alginic acid solids, approximately 80 lbs. of triethanolamine to form a paste.
10. A water soluble composition of matter comprising essentially triethanolamine alginate and triethanolamine.
11. A water soluble composition of matter comprising essentially triethanolamine alginate and alginic acid.
12. The process of preparing triethanolamine alginate which comprises mixing triethanolamine and wet alginic acid in their respective combining proportions and agitating the mixture until chemical combination occurs.
13. A propanolamine salt of alginic acid.
14. Alginic acid neutralized by an amine chosen from the group consisting of propanolamine, ethanolamine, and butanolamine.
15. The process of preparing an amine alginate which comprises drying alginic acid, then grinding it, then adding an amine whereby chemical combination occurs and a paste of the amine alginate is formed.

BENNETT PREBLE.